(12) United States Patent
Lee et al.

(10) Patent No.: US 12,017,132 B2
(45) Date of Patent: Jun. 25, 2024

(54) VIRTUAL GOLF SIMULATION PROCESSING METHOD AND SCREEN GOLF SYSTEM USING THE SAME

(71) Applicant: GOLFZON CO., LTD., Seoul (KR)

(72) Inventors: Kyung Yong Lee, Seoul (KR); Bong Ho Song, Seoul (KR); Min Kyoo Kim, Seoul (KR)

(73) Assignee: GOLFZON CO., LTD., Seoul (KR)

( * ) Notice: Subject to any disclaimer, the term of this patent is extended or adjusted under 35 U.S.C. 154(b) by 281 days.

(21) Appl. No.: 17/627,136

(22) PCT Filed: Jul. 10, 2020

(86) PCT No.: PCT/KR2020/009137
§ 371 (c)(1),
(2) Date: Jan. 14, 2022

(87) PCT Pub. No.: WO2021/010686
PCT Pub. Date: Jan. 21, 2021

(65) Prior Publication Data
US 2022/0249938 A1    Aug. 11, 2022

(30) Foreign Application Priority Data

Jul. 15, 2019  (KR) .................. 10-2019-0085309

(51) Int. Cl.
*A63B 69/36* (2006.01)
*A63B 71/06* (2006.01)
*A63F 13/573* (2014.01)

(52) U.S. Cl.
CPC .......... *A63B 71/0622* (2013.01); *A63B 69/36* (2013.01); *A63F 13/573* (2014.09); *A63B 2071/0636* (2013.01)

(58) Field of Classification Search
CPC ................ A63B 71/0622; A63B 69/36; A63B 2071/0636; A63F 13/573
See application file for complete search history.

(56) References Cited

U.S. PATENT DOCUMENTS

| | | | |
|---|---|---|---|
| 2003/0030636 A1* | 2/2003 | Yamaoka | H04N 5/2627 348/E5.042 |
| 2003/0052327 A1 | 3/2003 | Kwasnick et al. | |
| 2006/0003825 A1 | 1/2006 | Iwasaki et al. | |

(Continued)

FOREIGN PATENT DOCUMENTS

| KR | 10-1079013 B1 | 11/2011 |
|---|---|---|
| KR | 10-2012-0009933 A | 2/2012 |

(Continued)

OTHER PUBLICATIONS

International Search Report for PCT/KR2020/009137 mailed Jan. 15, 2021 from Korean Intellectual Property Office.

*Primary Examiner* — Corbett B Coburn
(74) *Attorney, Agent, or Firm* — Revolution IP, PLLC (57) ABSTRACT

The present invention relates to a virtual golf simulation processing method capable of providing various simulation image production modes such that, when a user takes a golf shot in a certain situation, a unique simulation image for the golf shot is produced, whereby a user who plays a virtual golf game experiences a more dramatic and dynamic simulation image, and therefore it is possible to induce interest of the user, and a screen golf system using the same.

5 Claims, 9 Drawing Sheets

(56) References Cited

U.S. PATENT DOCUMENTS

| | | | |
|---|---|---|---|
| 2010/0032904 A1* | 2/2010 | Yasuoka | A63F 13/428 |
| | | | 124/78 |
| 2012/0289351 A1* | 11/2012 | Woo | A63B 24/0003 |
| | | | 473/409 |
| 2013/0281223 A1* | 10/2013 | Lee | A63B 69/3658 |
| | | | 473/156 |
| 2014/0045624 A1* | 2/2014 | Forest | A63B 57/00 |
| | | | 473/409 |
| 2016/0158640 A1* | 6/2016 | Gupta | A63F 13/812 |
| | | | 463/3 |
| 2016/0287967 A1* | 10/2016 | Baldwin | A63B 69/3623 |
| 2016/0303456 A1* | 10/2016 | Arnold | A63B 69/3623 |
| 2017/0209764 A1* | 7/2017 | Choi | G09B 19/0038 |
| 2019/0022509 A1* | 1/2019 | Lee | A63B 71/0622 |
| 2019/0099655 A1 | 4/2019 | Park et al. | |
| 2019/0110004 A1* | 4/2019 | Pipher | H04N 5/2628 |
| 2019/0134506 A1* | 5/2019 | Gupta | G09B 19/0038 |
| 2020/0016497 A1* | 1/2020 | Nicora | A63B 69/3658 |

FOREIGN PATENT DOCUMENTS

| | | |
|---|---|---|
| KR | 10-2015-0020822 A | 2/2015 |
| KR | 10-1712838 B1 | 3/2017 |
| KR | 10-2018-0059624 A | 6/2018 |
| WO | 2011-081470 A2 | 7/2011 |

\* cited by examiner

VIRTUAL GOLF SIMULATION PROCESSING METHOD AND SCREEN GOLF SYSTEM USING THE SAME

TECHNICAL FIELD

The present invention relates to a virtual golf simulation processing method capable of implementing and simulating a virtual golf course as an image and implementing the trajectory of a golf ball directly hit by a user as a simulation image on the virtual golf course, whereby the user enjoys virtual golf, and a screen golf system using the same.

BACKGROUND ART

With the recent upsurge in the number of golfers, a so-called screen golf system, which enables a golfer to practice golf and to play a round of virtual golf using a virtual golf simulation apparatus, has gained popularity.

The screen golf system is a system that senses the velocity and direction of a golf ball that a golfer hits onto a screen installed indoors to display a virtual golf course and displays the progress of the golf ball on the screen. The screen golf system enables a user to feel the same realism that the user feels when playing a round of golf on an actual golf course, which exceeds the level of enjoyment of a golf game that is simply played indoors. For these reasons, the number of users who enjoy screen golf has increased considerably, in addition to users who play rounds of golf on an actual golf course.

It is necessary for the screen golf system implemented by the virtual golf simulation apparatus to provide the same sense of realism that golfers feel when the golfers play a round of golf on an actual golf course and to provide various kinds of content that is difficult to provide in actual golf course or a golf driving range due to characteristics thereof in that screen golf is implemented through various high-technology apparatuses and systems such that the golfers are interested in screen golf.

In particular, recently, the screen golf system has provided a production mode in which, in implementing a simulation image using the result of sensing of a user's golf shot by a sensing device, a camerawork for the simulation image is changed such that the simulation image that shows the result of the user's golf shot is more dramatically and dynamically expressed.

For example, a screen golf system commercialized by the applicant of the present application is configured such that, when a user takes a golf shot in a certain situation, an image is produced using a camerawork moving following a moving virtual ball behind the virtual ball in a simulation image thereof, wherein, in the case in which the result of simulation of the virtual ball is good, an image is progressed through a camerawork moving following the virtual ball behind the virtual ball, a change to a camerawork viewing flight of the virtual ball is changed at a landing point of the virtual ball, and the image is progressed.

In the conventional screen golf system, however, basically, a simulation image is implemented in the same production mode irrespective of when a user takes a tee shot, when the user takes a long iron shot, and when the user takes an approach shot, and, even though a simulation image is implemented in a production mode in which a camerawork is changed depending on the result of simulation, the production mode is a fixed mode, whereby only a uniform simulation image is provided. Consequently, it is not possible to implement a dramatic and dynamic simulation image, and therefore there is a limitation in a user who enjoys virtual golf being interested in screen golf.

PRIOR ART DOCUMENTS ARE AS FOLLOWS

International Application Publication No. WO2011/081470
US Patent Application Publication No. 2003/0052327
US Patent Application Publication No. 2006/0003825

DISCLOSURE

Technical Problem

The present invention has been made in view of the above problems, and it is an object of the present invention to provide a virtual golf simulation processing method capable of providing various simulation image production modes such that, when a user takes a golf shot in a certain situation, a unique simulation image for the golf shot is produced, whereby a user who plays a virtual golf game experiences a more dramatic and dynamic simulation image, and therefore it is possible to induce interest of the user, and a screen golf system using the same.

Technical Solution

In accordance with an aspect of the present invention, the above and other objects can be accomplished by the provision of a virtual golf simulation processing method of a screen golf system capable of enabling a virtual golf game to be played in a mode in which a virtual ball according to a golf shot of a user is simulated on a virtual golf course, the virtual golf simulation processing method including presetting a production mode to implement a simulation image according to each golf shot depending on the kind of golf shot to be taken by the user during playing of the virtual golf game on the virtual golf course, checking the kind of golf shot to be taken by the user during playing of the virtual golf game, sensing, by a sensing device, the virtual ball according to the golf shot of the user, and performing simulation of the virtual ball based on the result of sensing by the sensing device and implementing a simulation image in a production mode preset for the golf shot checked in the checking step.

The step of presetting the production mode may include presetting a plurality of cameraworks related to a viewpoint, angle, movement, and rotation of an output screen of the simulation image of the virtual ball and presetting a production mode using a combination of the two or more preset cameraworks for a simulation image according to each golf shot depending on the kind of golf shot to be taken by the user.

The step of implementing the simulation image may include determining whether the result of sensing of the ball according to the golf shot of the user in the sensing step satisfies preset production requirements, upon determining that the ball according to the golf shot satisfies the production requirements, implementing a simulation image in a production mode preset for the golf shot, upon determining that the ball according to the golf shot does not satisfy the production requirements, implementing a simulation image in a production mode set by default.

The step of presetting the production mode may further include presetting a plurality of production modes each using a combination of two or more cameraworks for at least one specific golf shot, and the step of implementing the simulation image may include, when the specific golf shot is taken, implementing a plurality of production modes preset for the golf shot based on priority thereof or randomly.

The virtual golf simulation processing method may further include performing simulation computation through a separate process using the result of sensing by the sensing device independent of simulation of the virtual ball on which the simulation image is implemented in order to determine whether the simulated virtual ball is OB or is placed in a hazard, and upon determining that the virtual ball is OB or is placed in the hazard, implementing a simulation image while a camerawork in a production mode simulated in the step of implementing the simulation image is changed to a camerawork preset for the case in which virtual ball is OB or is placed in the hazard.

In accordance with another aspect of the present invention, there is provided a screen golf system capable of enabling a virtual golf game to be played in a mode in which a virtual ball according to a golf shot of a user is simulated on a virtual golf course, the screen golf system including a sensing device configured to sense the virtual ball according to the golf shot of the user, a simulator configured to preset a production mode to implement a simulation image according to each golf shot depending on the kind of golf shot to be taken by the user during playing of the virtual golf game on the virtual golf course, to check the kind of golf shot to be taken by the user during playing of the virtual golf game, to perform simulation of the virtual ball based on the result of sensing by the sensing device, and to perform image processing so as to implement a simulation image in a production mode preset for the golf shot checked in the checking step, and an image output device configured to output the image processed by the simulator.

Advantageous Effects

A virtual golf simulation processing method according to the present invention and a screen golf system using the same have effects in that it is possible to provide various simulation image production modes such that, when a user takes a golf shot in a certain situation, a unique simulation image for the golf shot is produced, whereby a user who plays a virtual golf game experiences a more dramatic and dynamic simulation image, and therefore it is possible to induce interest of the user, and a screen golf system using the same.

BEST MODE

A virtual golf simulation processing method according to the present invention and a screen golf system using the same will be described in detail with reference to the accompanying drawings.

First, the construction of a screen golf system according to an embodiment of the present invention will be described with reference to FIGS. 1 and 2.

Figure 1:
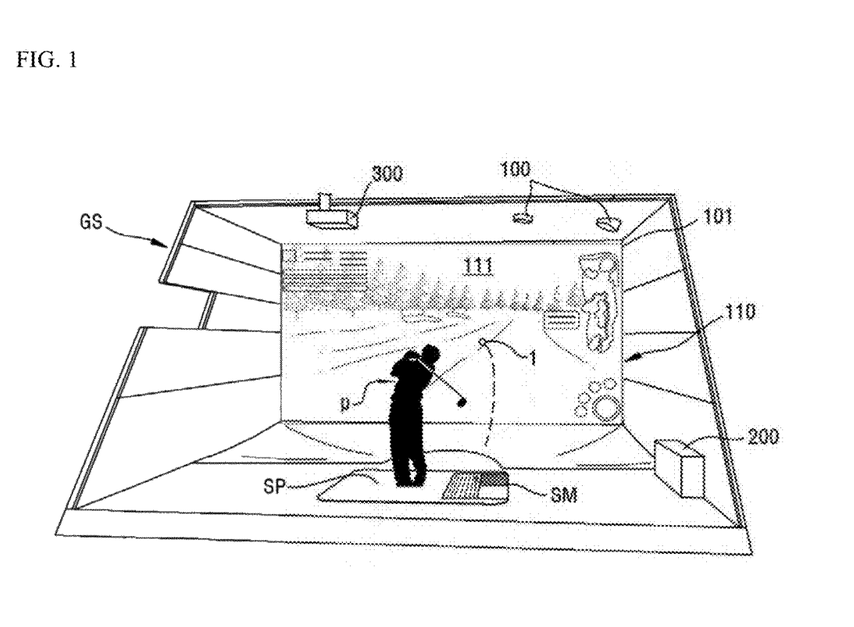
FIG. 1 is a view showing a screen golf system according to an embodiment of the present invention.
Figure 2:
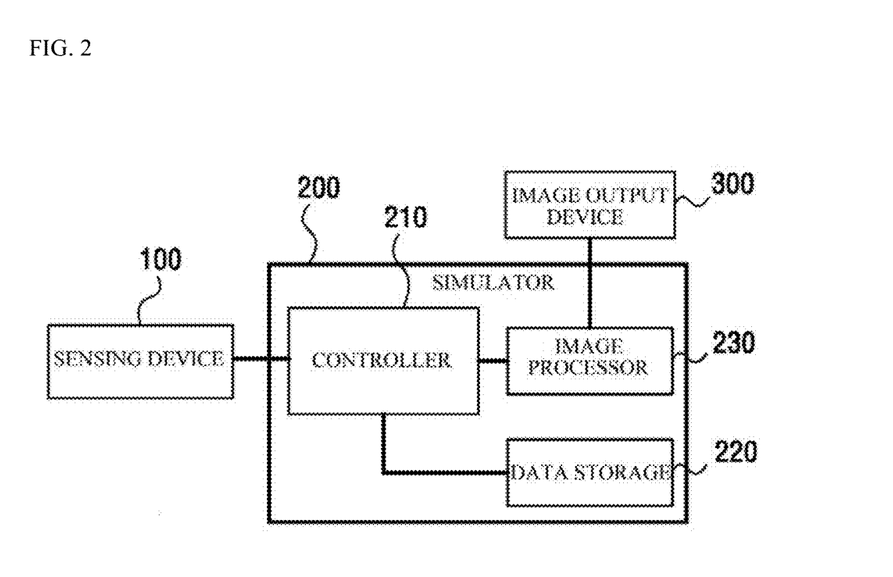
FIG. 2 is a block diagram showing the construction of the screen golf system shown in FIG. 1.

FIG. 1 is a view showing a screen golf system according to an embodiment of the present invention, and FIG. 2 is a block diagram showing the construction of the screen golf system shown in FIG. 1.

As shown in FIG. 1, the screen golf system according to the embodiment of the present invention may be configured such that a shot plate SP, on which a user P takes a golf swing, a golf mat SM, on which a golf ball 1 to be hit by the user P is placed, a screen 101, which is installed in front of the golf mat, and an image output device 300 configured to project an image 110 onto the screen 101 are provided in a predetermined space GS in which the user plays a virtual golf game, wherein the shot plate SP may be implemented as a swing plate configured to implement inclination corresponding to topography of a virtual golf course 111 on an image.

As shown in FIGS. 1 and 2, the screen golf system according to the embodiment of the present invention may include a sensing device 100, a simulator 200, and an image output device 300.

The sensing device 100, which is a device configured to sense motion of at least one of a golf club and a golf ball after the user takes a golf swing, captures and collects an image of a golf ball 1 hit by the user as the result of taking a golf shot within an angle of view of a camera using the camera, performs analysis, such as image processing, on the collected image, calculates sensing information, such as motion parameters, about movement of the golf ball 1, and transmits the calculated sensing information to the simulator 200.

The simulator 200, which includes a controller 210, a data storage 220, and an image processor 230, is a means that is manipulated by the user to set a virtual golf simulation environment or that is manipulated by the user to adjust aiming during a round of virtual golf, wherein the simulator may be provided with a manipulation device (not shown).

The data storage 220 stores all data necessary to implement a virtual golf simulation image, data about a virtual golf course implemented by imaging an actual golf course, and data about topography information of the virtual golf course. Consequently, the data storage may provide data capable of implementing a virtual environment in which the user plays a round of virtual golf on a virtual golf course selected by the user.

The data storage 220 may be configured to store various data about a virtual golf course, or may be configured to receive various data about a virtual golf course from a server (not shown) over the network and to temporarily store the data about the virtual golf course.

The image processor 230 performs information processing to implement an image of the virtual golf course on a screen using the data about the virtual golf course stored in the data storage 220, and performs information processing to implement an image in which the trajectory of the golf ball hit by the user is simulated on the virtual golf course.

Image information processed by the image processor 230 is projected on the screen 101 through the image output device 300, which may be implemented by a projector, such that the user P can view an image 110 projected on the screen 101.

The image processor 230 may be implemented as a modularized part of a standalone device configured to perform an image processing function, or may be implemented as a standalone device.

The controller 210, which is a component configured to control all processing for virtual golf simulation, performs various kinds of calculation and control to accomplish a simulation in which a virtual ball is moving on the virtual golf course 111 based on sensing information about the moving golf ball extracted according to the result of sensing by the sensing device 100 and a physical engine. An image 110 in which a virtual ball is simulated according to the result of sensing by the sensing device and the physical engine on the virtual golf course 111 is implemented based on the various kinds of calculation and control.

The controller 210 presets a production mode of a simulation image that is processed by the image processor 230, and, when production requirements are satisfied, controls the image processor 230 such that a simulation image according to the production mode is implemented.

In particular, the controller 210 of the simulator 200 of the screen golf system according to the embodiment of the present invention does not set one production mode and does not implement a simulation image based on the production mode, but implements a simulation image based on various production modes in various situations in order to induce user's interest in a virtual golf game and to remarkably improve user immersion in the virtual golf game.

Figure 3:
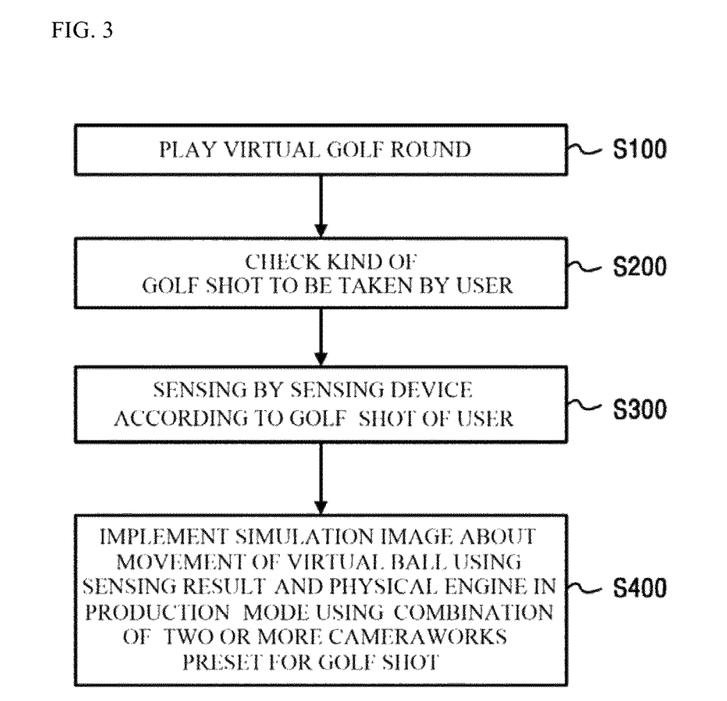
FIG. 3 is a flowchart illustrating the overall flow of a virtual golf simulation processing method according to an embodiment of the present invention.

The virtual golf simulation processing method of the screen golf system according to the embodiment of the present invention will be described in more detail with reference to the flowcharts of FIGS. 3 and 4.

The virtual golf simulation processing method according to the embodiment of the present invention, which is a virtual golf simulation processing method of a screen golf system capable of enabling a virtual golf game to be played in a mode in which a virtual ball according to a golf shot of a user is simulated on a virtual golf course, presets a production mode to implement a simulation image according to each golf shot depending on the kind of golf shot to be taken by the user during playing of the virtual golf game on the virtual golf course.

For example, different production modes are preset so as to use a combination of different image cameraworks for golf shots, such as a tee shot, an iron shot, and an approach shot, and when a specific golf shot is taken, a simulation image of the golf shot based on a production mode using a combination of cameraworks preset for the golf shot.

Here, "cameraworks" are related to a viewpoint, angle, movement, and rotation of an output screen of a simulation image of a virtual ball, and the content of an image that is output is changed depending on cameraworks even for the same simulation.

That a production mode of a simulation image is preset for each kind of golf shot, as described above, is that a plurality of cameraworks to be output as an image is preset, a production mode using a combination of two or more preset cameraworks for a simulation image according to each golf shot depending on the kind of golf shot to be taken by the user is preset, and when a certain golf shot is taken, a simulation image of the golf shot is implemented based on a production mode using a combination of cameraworks preset for the golf shot.

A virtual golf game is played in the state in which the controller of the simulator presets different image production modes such that a unique simulation image of each golf shot is implemented depending on the kind of golf shot (S100), as described above, and the user takes a necessary golf shot during playing of the virtual golf game. At this time, the controller checks the kind of golf shot to be taken by the user (S200).

For example, the controller checks whether the user takes a tee shot for a par 4 hole (same for a par 5 hole or a par 6 hole), the user takes a tee shot for a par 3 hole, the user takes a golf shot using a long iron, or the user takes an approach shot.

Meanwhile, when the user takes a golf shot, the sensing device senses a ball according to the golf shot (S300).

The controller of the simulator controls the image processor to implement a simulation image about the movement of a virtual ball using the result of sensing by the sensing device and the physical engine, wherein the image is implemented in a production mode using a combination of two or more cameraworks preset for the golf shot (S400).

A more concrete example thereof will be described with reference to the flowchart shown in FIG. 4.

The controller of the simulator according to the present invention may set a first golf shot, a second golf shot, a third golf shot, and a fourth golf shot as kinds of golf shots that may be taken by the user during playing of a virtual golf game on a virtual golf course, and may differently set a production mode of a simulation image about a golf ball for each golf shot.

For example, the first golf shot may be set as a tee shot for a par 4 hole, a par 5 hole, or a par 6 hole (i.e. a tee shot using a driver), the second golf shot may be set as a tee shot for a par 3 hole (i.e. a tee shot using a wood or an iron), the third golf shot may be set as an iron shot using a long iron, and the fourth golf shot may be set as an approach shot using a short iron or a wedge.

Cameraworks, on which a production mode of a simulation image preset for each golf shot is based, may be variously set.

For example, a first production mode may be preset for the first golf shot (e.g. a tee shot for a par 4 hole, a par 5 hole, or a par 6 hole), and the first production mode may set to have a combination of a camerawork fixed at a hitting point and a camerawork moving following a virtual ball.

A second production mode may be preset for the second golf shot (e.g. a tee shot for a par 3 hole), and the second production mode may be set to have a combination of a camerawork moving upwards following the virtual ball from the hitting point, a camerawork moving following the virtual ball, and a camerawork viewing the virtual ball a predetermined distance from a landing point of the virtual ball.

A third production mode may be preset for the third golf shot (e.g. an iron shot using a long iron), and the third production mode may be set to have a combination of a camerawork moving following the virtual ball from the hitting point and a camerawork viewing the virtual ball around the landing point of the virtual ball.

A fourth production mode may be preset for the fourth golf shot (e.g. an approach shot using a short iron or a wedge), and the fourth production mode may be set to have a combination of a camerawork moving following the virtual ball from the hitting point and a camerawork viewing the virtual ball in the air higher than the virtual ball.

In the state in which setting is performed, as described above, the virtual golf game is played (S100). When the user takes the first golf shot during playing of the virtual golf game (S210), the sensing device senses the ball (S310), and the controller determines whether the result of sensing by the sensing device satisfies preset production requirements in order to implement a simulation image in the first production mode preset for the first golf shot (S411).

In the first production mode, a simulation image is implemented using a combination of two or more cameraworks. Consequently, the flight time of the ball must be secured to some extent in order to produce the image, and therefore production requirements for applying the first production mode may be determined based on whether the initial speed and the height angle of the golf ball calculated according to sensing are within a predetermined range.

If the sensing result according to the first golf shot does not satisfy the production requirements (if the golf shot is incorrectly taken, for example if the golf ball is incorrectly hit or if the golf ball rolls on the ground without flying), a simulation image is not implemented in the preset first production mode, and a simulation image is implemented in a mode set by default (S500). For example, an image may be implemented in a mode of viewing the virtual ball from a fixed position, or an image may be implemented in a mode of moving following the virtual ball.

When the first golf shot satisfies the production requirements, the controller may control the image processor such that a simulation image is implemented in the first production mode preset for the first golf shot using a combination of cameraworks preset for the first production mode (S421).

The above description is related to the case in which one production mode is preset for one kind of golf shot. However, the present invention is not limited thereto. Two or more production modes may be preset for one kind of golf shot, and one of the two or more production modes may be randomly performed.

For example, in addition to the first production mode for the first golf shot, a first' production mode (e.g. a production mode having a combination of a camerawork providing a fixed view at a hitting point and a camerawork viewing a virtual ball at a landing position of the virtual ball) may also be preset, and when the first golf shot is taken and the production requirements are satisfied, one of the first production mode and the first' production mode may be randomly performed.

Alternatively, a plurality of production modes may be preset for the first golf shot, the priority of the production modes may be set (e.g. based on carry distance), and a simulation image may be implemented in the production mode based on the conditions.

Figure 5:
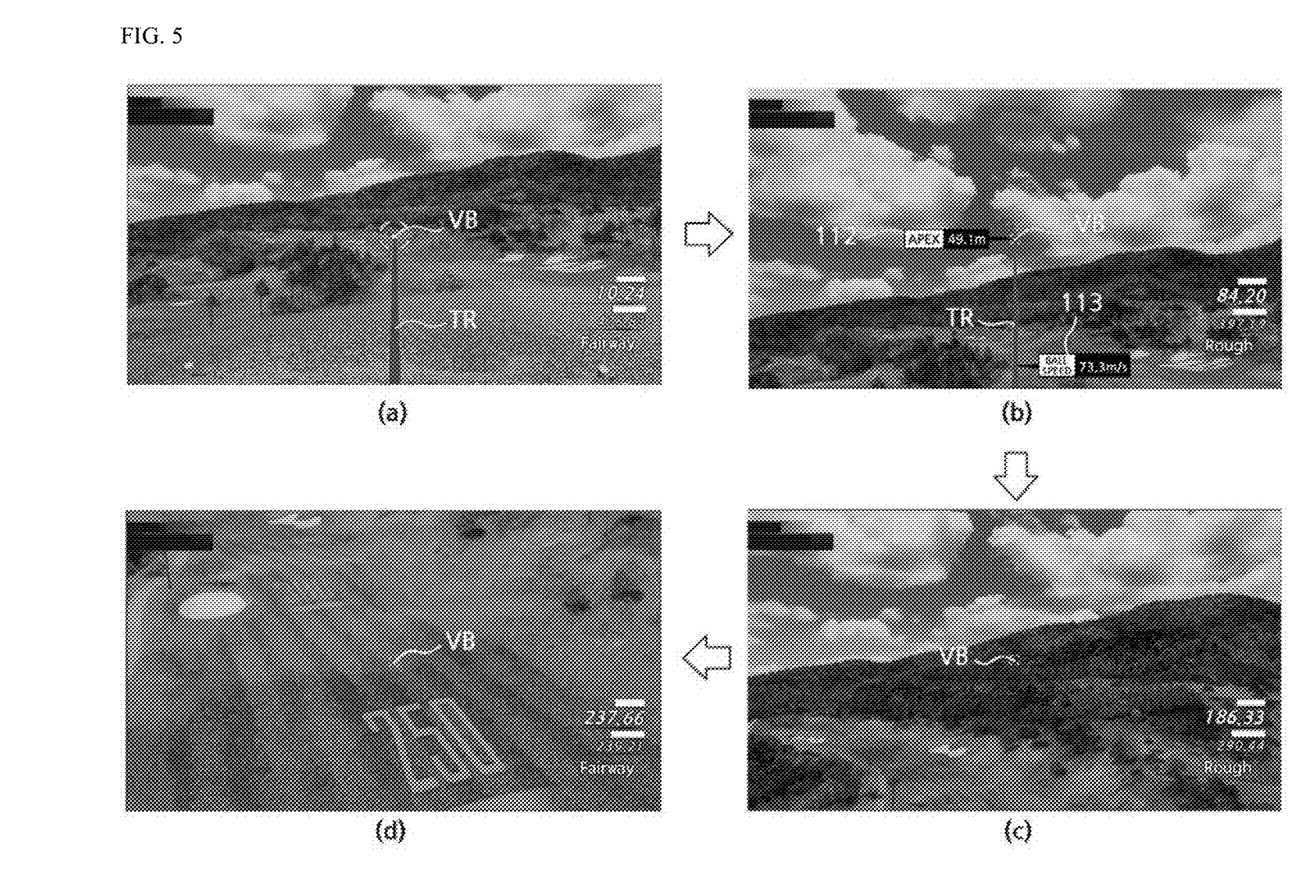
FIGS. 5 to 9 are views showing examples in which simulation images are implemented in different production modes based on kinds of golf shots according to the virtual golf simulation processing method used in the screen golf system according to the embodiment of the present invention.
Figure 6:
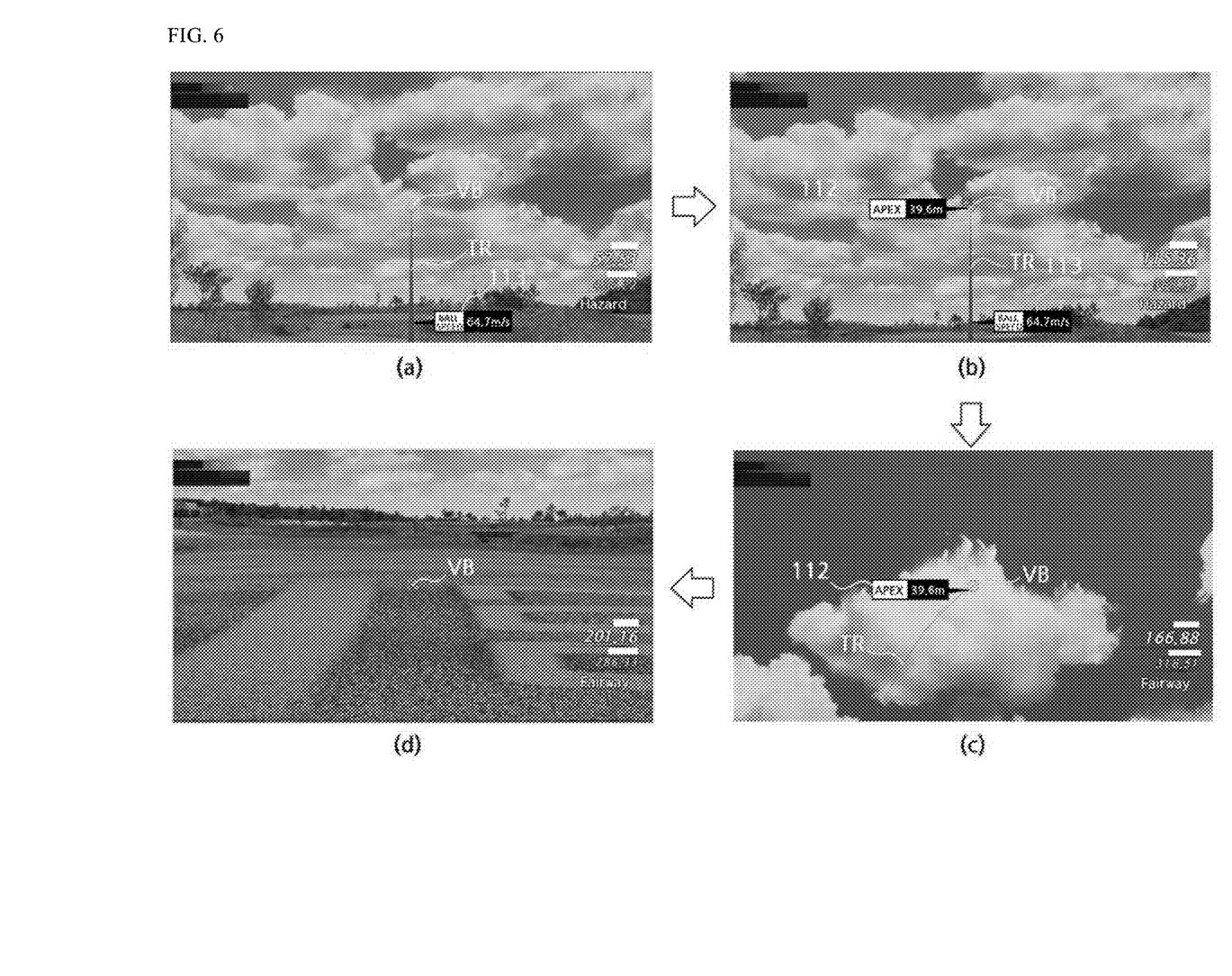

An example of the first production mode is shown in FIG. 5, and an example of the first' production mode is shown in FIG. 6. FIGS. 5 and 6 show that, when the first golf shot is a tee shot for a par 4 hole, a par 5 hole, or a par 6 hole, a simulation image is implemented in a production mode preset for the golf shot.

In an example of the production mode shown in FIG. 5, a virtual ball VB flying along a trajectory TR is viewed according to a camerawork fixed to a viewpoint of a hitting point and when the virtual ball VB reaches the highest point, as shown in FIGS. 5(a) and 5(b), a simulation image may be implemented through a camerawork viewing the virtual ball VB while moving following the virtual ball, as shown in FIGS. 5(c) and 5(d).

At this time, various changes may be implemented. That is, the camerawork shown in FIGS. 5(a) and 5(b) may show the trajectory TR of the virtual ball VB, and when the virtual ball reaches the highest point (APEX), may show information about the apex height 112 and information about the ball speed 113, and the camerawork moving following the virtual ball VB may show only an image of the virtual ball VB.

In an example of the production mode shown in FIG. 6, a virtual ball VB flying along a trajectory TR is viewed according to a camerawork fixed to a viewpoint of a hitting point and when the virtual ball VB reaches the highest point, as shown in FIGS. 6(a) and 6(b), a simulation image may be implemented through a camerawork viewing flight of the virtual ball VB around a landing point of the virtual ball, as shown in FIGS. 6(c) and 6(d).

In FIG. 6, the production mode showing the trajectory TR of the virtual ball VB, and when the virtual ball reaches the highest point (APEX), showing information about the apex height 112 and information about the ball speed 113 is implemented.

Meanwhile, referring back to FIG. 4, when the user takes the second golf shot during playing of the virtual golf game (S220), the sensing device senses the ball (S320), and the controller determines whether the result of sensing by the sensing device satisfies preset production requirements in order to implement a simulation image in the second production mode preset for the second golf shot (S412).

In the second production mode, a simulation image is implemented using a combination of two or more cameraworks. Consequently, the flight time of the ball must be secured to some extent in order to produce the image, and therefore production requirements for applying the second production mode may be determined based on whether the initial speed and the height angle of the golf ball calculated according to sensing are within a predetermined range.

If the sensing result according to the second golf shot does not satisfy the production requirements, a simulation image is not implemented in the preset second production mode, and a simulation image is implemented in a mode set by default(S500). For example, an image may be implemented in a mode of viewing the virtual ball from a fixed position, or an image may be implemented in a mode of moving following the virtual ball.

When the second golf shot satisfies the production requirements, the controller may control the image processor such that a simulation image is implemented in the second production mode preset for the second golf shot using a combination of cameraworks preset for the second production mode (S422).

Figure 7:
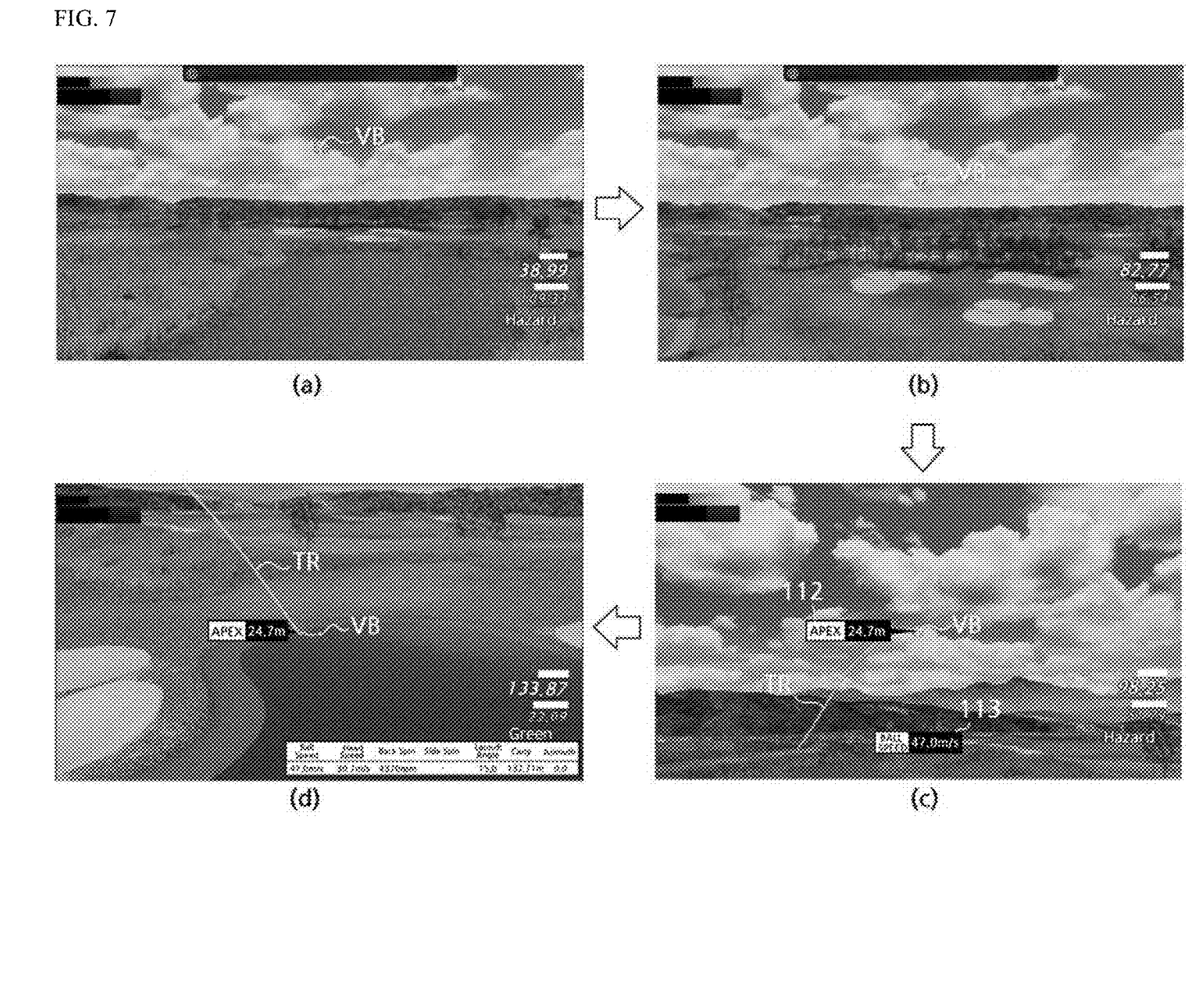

An example of the second production mode is shown in FIG. 7. FIG. 7 shows that, when the second golf shot is a tee shot for a par 3 hole, a simulation image is implemented in a production mode preset for the golf shot.

In an example of the production mode shown in FIG. 7, a simulation image is implemented using a combination of a camerawork moving upwards following the virtual ball VB from the hitting point, as shown in FIG. 7(a), a camerawork moving following the virtual ball VB, as shown in FIG. 7(b), and a camerawork viewing the virtual ball VB a predetermined distance from the landing point of the virtual ball, as shown in FIGS. 7(c) and 7(d).

In FIG. 7, only the virtual ball appears in the image when a camerawork viewing flight of the virtual ball from behind the virtual ball is implemented, as shown in FIGS. 7(a) and 7(b), when the viewpoint of the camerawork is changed and an image is implemented according to a camerawork viewing the virtual ball VB from a predetermined distance, as shown in FIGS. 7(c) and 7(d), the trajectory TR of the virtual ball VB is displayed, and when the virtual ball reaches the highest point (APEX), information about the apex height 112 and information about the ball speed 113 are displayed.

Meanwhile, referring back to FIG. 4, when the user takes the third golf shot during playing of the virtual golf game (S230), the sensing device senses the ball (S330), and the controller determines whether the result of sensing by the sensing device satisfies preset production requirements in order to implement a simulation image in the third production mode preset for the third golf shot (S413).

In the third production mode, a simulation image is implemented using a combination of two or more cameraworks. Consequently, the flight time of the ball must be secured to some extent in order to produce the image, and therefore production requirements for applying the third production mode may be determined based on whether the initial speed and the height angle of the golf ball calculated according to sensing are within a predetermined range.

If the sensing result according to the third golf shot does not satisfy the production requirements, a simulation image is not implemented in the preset third production mode, and a simulation image is implemented in a mode set by default (S500). For example, an image may be implemented in a mode of viewing the virtual ball from the fixed position, or an image may be implemented in a mode of moving following the virtual ball.

When the third golf shot satisfies the production requirements, the controller may control the image processor such that a simulation image is implemented in the third production mode preset for the third golf shot using a combination of cameraworks preset for the third production mode (S423).

Figure 8:
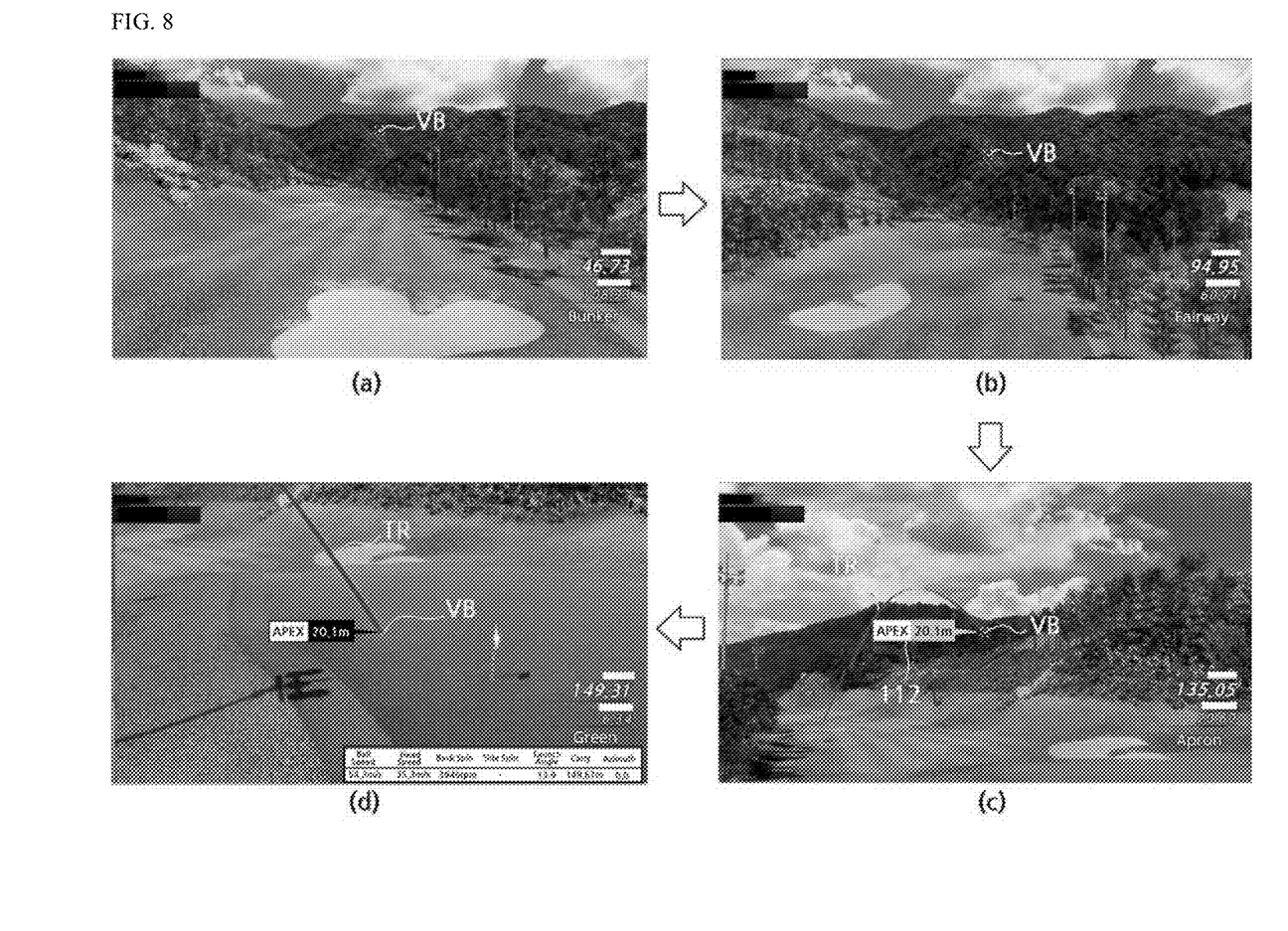

An example of the third production mode is shown in FIG. 8. FIG. 8 shows that, when the third golf shot is an iron shot using a long iron, a simulation image is implemented in a production mode preset for the golf shot.

In an example of the production mode shown in FIG. 8, a simulation image is implemented using a combination of a camerawork moving following the virtual ball VB from the hitting point, as shown in FIGS. 8(*a*) and 8(*b*), and a camerawork viewing the virtual ball VB around the landing point of the virtual ball, as shown in FIGS. 8(*c*) and 8(*d*).

In FIG. 8, only the virtual ball appears in the image when a camerawork viewing flight of the virtual ball from behind the virtual ball is implemented, as shown in FIGS. 8(*a*) and 8(*b*), when the viewpoint of the camerawork is changed and an image is implemented according to a camerawork viewing the virtual ball VB around the landing point, as shown in FIGS. 8(*c*) and 8(*d*), the trajectory TR of the virtual ball VB is displayed, and when the virtual ball reaches the highest point (APEX), information about the apex height 112 and information about the ball speed 113 are displayed.

Meanwhile, referring back to FIG. 4, when the user takes the fourth golf shot during playing of the virtual golf game (S240), the sensing device senses the ball (S340), and the controller determines whether the result of sensing by the sensing device satisfies preset production requirements in order to implement a simulation image in the fourth production mode preset for the fourth golf shot (S414).

In the fourth production mode, a simulation image is implemented using a combination of two or more cameraworks. Consequently, the flight time of the ball must be secured to some extent in order to produce the image, and therefore production requirements for applying the fourth production mode may be determined based on whether the initial speed and the height angle of the golf ball calculated according to sensing are within a predetermined range.

If the sensing result according to the fourth golf shot does not satisfy the production requirements, a simulation image is not implemented in the preset fourth production mode, and a simulation image is implemented in a mode set by default (S500). For example, an image may be implemented in a mode of viewing the virtual ball from the fixed position, or an image may be implemented in a mode of moving following the virtual ball.

When the fourth golf shot satisfies the production requirements, the controller may control the image processor such that a simulation image is implemented in the fourth production mode preset for the fourth golf shot using a combination of cameraworks preset for the fourth production mode (S424).

Figure 9:
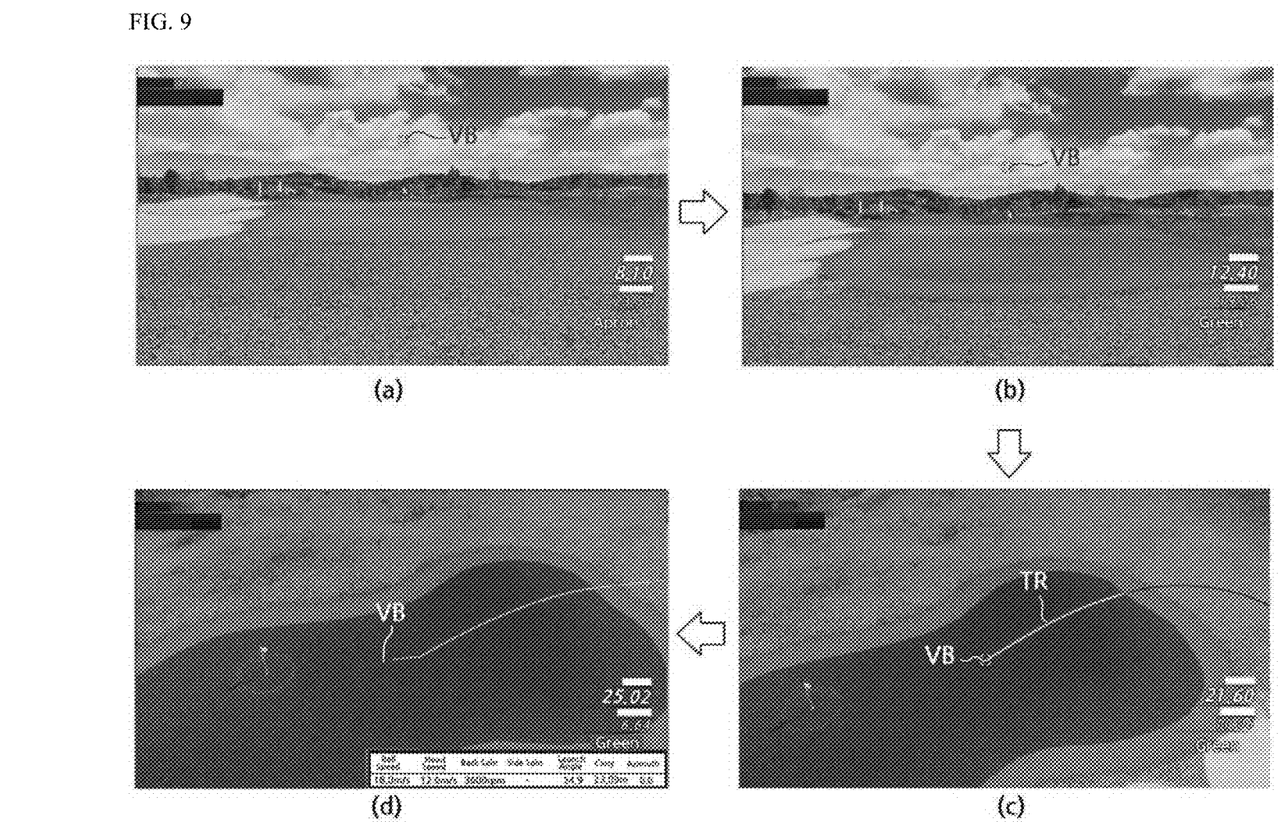

An example of the fourth production mode is shown in FIG. 9. FIG. 9 shows that, when the fourth golf shot is an approach shot using a short iron or a wedge, a simulation image is implemented in a production mode preset for the golf shot.

In an example of the production mode shown in FIG. 9, a simulation image is implemented using a combination of a camerawork moving following the virtual ball VB from the hitting point, as shown in FIGS. 9(*a*) and 9(*b*), and a camerawork viewing the overall trajectory of the virtual ball VB in the air higher than the virtual ball, as shown in FIGS. 9(*c*) and 9(*d*).

In FIGS. 9(*a*) and 9(*b*), only movement of the virtual ball VB is shown, and the trajectory TR of the virtual ball VB is displayed when an image is implemented according to a camerawork having a changed viewpoint.

As described above, a simulation image is implemented in an image production mode using a combination of unique cameraworks enabling a simulation image according to each golf shot to show well the characteristics of the golf shot for each kind of golf shot, whereby a user who takes a golf shot may watch that the result of the shot is more dramatically and dynamically developed in the simulation image, and therefore it is possible to further improve user immersion in the game.

Meanwhile, in the "golf shot" described above, a production mode using a combination of two or more cameraworks is pressed for each kind of golf shot, and a simulation image is implemented using a combination of plural cameraworks, and therefore it is preferable to exclude the case of putting, in which the ball does not fly but rolls.

In the case of putting (S250), a simulation image preset for putting may be implemented (S425).

Meanwhile, a virtual golf simulation processing method of a screen golf system according to another embodiment of the present invention will be described with reference to FIG. 10.

The screen golf system according to the other embodiment of the present invention is characterized by implementing a simulation image in which, when a user takes a golf shot, such as a tee shot or a long iron shot, a virtual ball according to the golf shot is out of bounds (OB) or is placed in a hazard.

Figure 10:
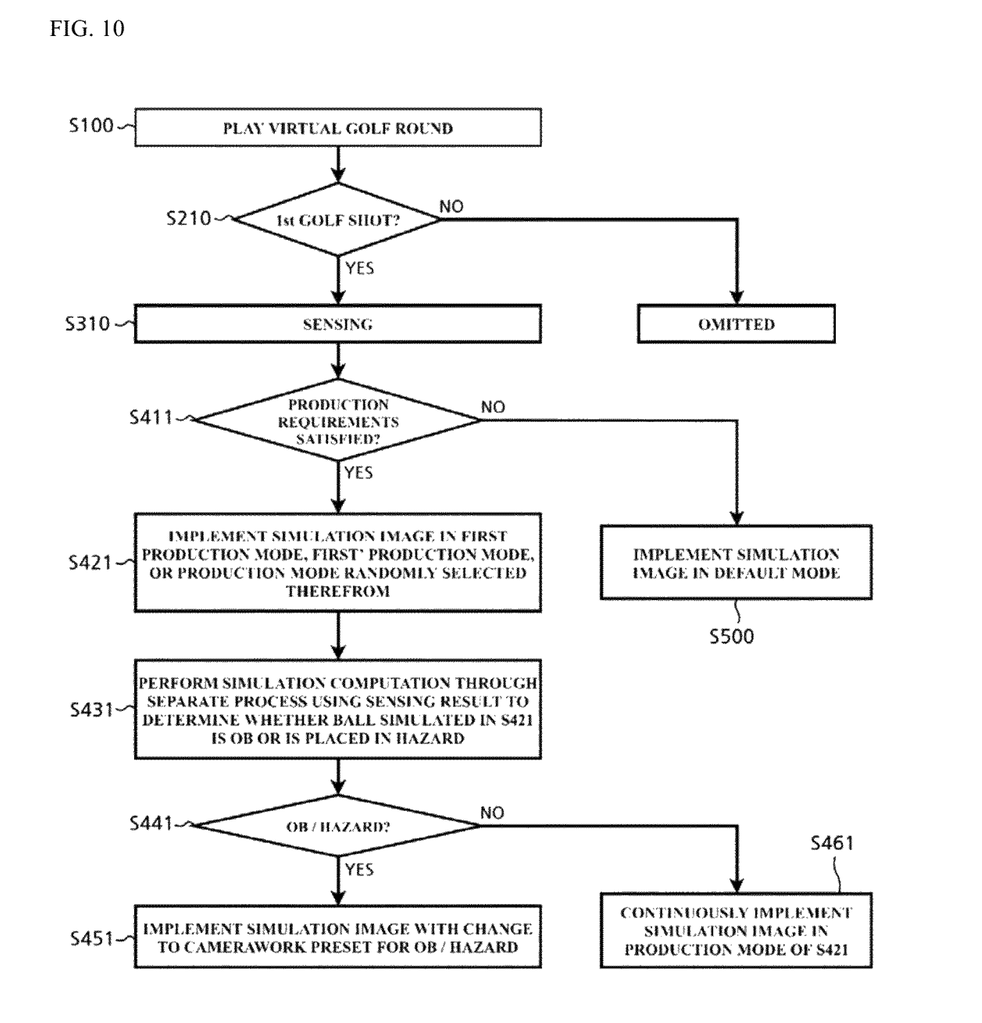
FIG. 10 is a flowchart illustrating a virtual golf simulation processing method according to another embodiment of the present invention.

FIG. 10 shows the case of a first golf shot by way of example. Of course, however, the same may be equally applied to other golf shots, such as a second golf shot or a third golf shot.

Figure 4:
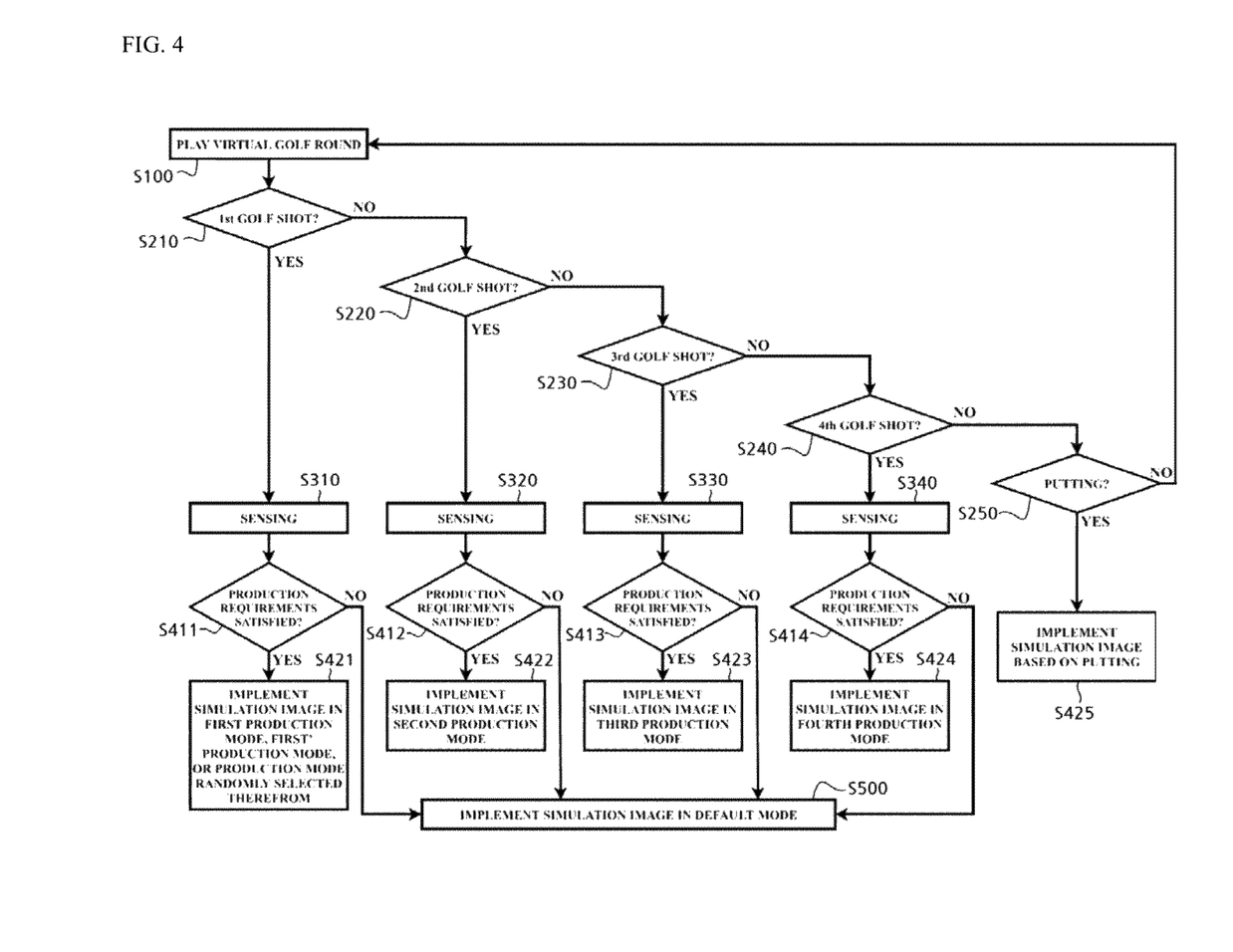
FIG. 4 is a flowchart illustrating a more detailed example of the flow of the virtual golf simulation processing method according to the embodiment of the present invention shown in FIG. 3.

In the flowchart shown in FIG. 10, steps S100, S210, S310, S411, S421, and S500, which are identical to the steps shown in FIG. 4, have been previously described, and therefore a description thereof will be omitted.

When the user takes the first golf shot, sensing by the sensing device is performed, and the sensing result satisfies production requirements of the first production mode or the first' production mode, the controller controls the image processor such that a simulation image is implemented in the first production mode, the first' production mode, or a production mode randomly selected therefrom (S421). At this time, the controller performs simulation computation through a separate process using the result of sensing by the sensing device to determine whether the ball simulated in step S421 is OB or is placed in a hazard (S431).

Upon determining that the ball is OB or is placed in a hazard (S441), the controller changes a camerawork of simulation according to step S421, which is currently performed, to a camerawork preset for the case of OB or a hazard and implements a simulation image (S451).

For example, a simulation image is progressed through a camerawork viewing flight of the virtual ball according to step S421 from a fixed position and then moving following the virtual ball, and upon determining according to step S431 that the ball is OB or is placed in a hazard, the camerawork is changed, and therefore an image is implemented through in a camerawork viewing that the virtual ball is OB or is placed in a hazard in a state of being fixed at that place, not following the virtual ball any longer.

In step S431, whether the virtual ball is OB or is placed in a hazard is determined based on simulation computation through the separate process, and the virtual ball simulated in step S421 is not OB or is not placed in a hazard, a simulation image is continuously progressed in the first production mode or the first' production mode performed in step S421 (S461).

As described above, the present invention has features in that a simulation image is implemented in an image production mode using a combination of unique cameraworks enabling a simulation image according to each golf shot to show well the characteristics of the golf shot for each kind of golf shot taken by a user during playing of a virtual golf game on a virtual golf course, whereby the user who takes the golf shot may watch that the result of the shot is more dramatically and dynamically developed in the simulation image, and therefore it is possible to induce user's interest in the game and to further improve user immersion in the game.

INDUSTRIAL APPLICABILITY

A virtual golf simulation processing method according to the present invention and a screen golf system using the same are applicable to industries related to golf practice and industries related to so-called screen golf, in which golf simulation based on virtual reality is implemented as an image, whereby a user may enjoy a round of virtual golf.

The invention claimed is:

1. A method of producing an image of a virtual golf simulation processed by a screen golf system including a simulator which implements an image of a virtual golf course and an virtual golf simulation image in which a virtual ball moves on the virtual golf course by using sensing data obtained by sensing a golf ball moved by the user's golf shot during a virtual golf game of the user using the screen golf system, the method processed by the simulator comprising:
presetting a plurality of different cameraworks each of which is related to a viewpoint, angle, movement and rotation of an output scene of a simulation image of the virtual ball;
presetting a production mode to implement a simulation image according to each type of the golf shot to be performed by the user in a golf play based on the virtual golf course image by combining two or more preset cameraworks;
checking the kind of golf shot to be taken by the user during playing of the virtual golf game;
obtaining sensing data of the golf ball from a sensing device which senses a movement of the golf ball according to the golf shot of the user; and
simulating the virtual ball using a physical engine of the simulator based on the sensing data, and implementing the simulation image in which the virtual ball moves on the virtual golf course in the production mode preset for the golf shot checked in the checking step.

2. The method of claim 1, wherein the step of implementing the simulation image comprises:
determining whether the result of sensing of the ball according to the golf shot of the user in the sensing step satisfies preset production requirements;
upon determining that the ball according to the golf shot satisfies the production requirements, implementing a simulation image in a production mode preset for the golf shot; and
upon determining that the ball according to the golf shot does not satisfy the production requirements, implementing a simulation image in a production mode set by default.

3. The virtual golf simulation processing method according to claim 1, wherein
the step of presetting the production mode further comprises presetting a plurality of production modes each using a combination of two or more cameraworks for at least one specific golf shot, and
the step of implementing the simulation image comprises, when the specific golf shot is taken, implementing a plurality of production modes preset for the golf shot based on priority thereof or randomly.

4. The method of claim 1, further comprising:
performing simulation computation through a separate process using the result of sensing by the sensing device independent of simulation of the virtual ball on which the simulation image is implemented in order to determine whether the simulated virtual ball is OB or is placed in a hazard; and
upon determining that the virtual ball is OB or is placed in the hazard, implementing a simulation image while a camerawork in a production mode simulated in the step of implementing the simulation image is changed to a camerawork preset for a case in which virtual ball is OB or is placed in the hazard.

5. A screen golf system configured to enable a virtual golf game to be played in a mode in which a virtual ball according to a golf shot of a user is simulated on a virtual golf course, the screen golf system comprising:
a sensing device configured to sense a movement of a golf ball according to the golf shot of the user and obtain sensing data of the golf ball;
a simulator configured to
preset a plurality of different cameraworks each of which is related to a viewpoint, angle, movement and rotation of an output scene of a simulation image of the virtual ball,
preset a production mode to implement a simulation image according to each type of the golf shot to be performed by the user in a golf play based on a virtual golf course image by combining two or more preset cameraworks, check a kind of golf shot to be taken by the user during playing of the virtual golf game, and simulate the virtual ball using a physical engine of the simulator based on the sensing data, and implement a simulation image in which the virtual ball moves on the virtual golf course in the production mode preset for the golf shot; and an image output device configured to output the simulation image processed by the simulator.

* * * * *